United States Patent [19]
King, Jr.

[11] 3,910,474
[45] Oct. 7, 1975

[54] TUBING SEVERING TOOL

[76] Inventor: John O. King, Jr., 3990 N. Ivy Road, Atlanta, Ga. 30342

[22] Filed: Apr. 5, 1974

[21] Appl. No.: 458,216

Related U.S. Application Data

[60] Division of Ser. No. 274,613, July 24, 1972, Pat. No. 3,803,895, which is a continuation-in-part of Ser. No. 882,126, Dec. 4, 1969, Pat. No. 3,679,109, which is a continuation-in-part of Ser. No. 711,368, March 7, 1968, abandoned.

[52] U.S. Cl. ............... 225/96.5; 30/124 R; 72/324; 81/5.1 R; 225/93 R
[51] Int. Cl.² ......................................... B65H 17/28
[58] Field of Search ............ 244/132, 132.5; 83/178, 83/184, 192, 193; 72/324, 325, 326, 332, 338, 319; 30/92 R, 92 XR, 93, 94 R, 94 XR, 95, 95 XR, 96, 102 R, 102 XR, 124 R, 124 XR, 134 R, 134 XR, 135 R, 135 XR; 81/5.1 R, 5.1 A, 418, 421, 422, 423, 425 R, 425 A, 426; 225/2, 96.5, 103

[56] References Cited
UNITED STATES PATENTS

| | | | |
|---|---|---|---|
| 1,467,264 | 9/1923 | Breeze | 72/317 |
| 1,761,446 | 6/1930 | Lindstrom | 30/124 X |
| 1,765,165 | 6/1930 | Krosta | 30/124 X |
| 2,103,597 | 12/1937 | Ravenscroft | 30/124 X |
| 2,985,957 | 5/1961 | Freedman | 30/124 R |
| 3,251,260 | 5/1966 | Serdechny | 29/450 |
| 3,327,389 | 6/1967 | Beeson | 30/124 R |
| 3,567,088 | 3/1971 | Andersen | 225/103 |

*Primary Examiner*—Richard J. Herbst
*Assistant Examiner*—James R. Duzan
*Attorney, Agent, or Firm*—B. J. Powell

[57] ABSTRACT

A tubing severing tool designed especially for adjusting the length of a thin walled tubular sleeve. The severing tool includes an internal support mandrel for internally supporting the sleeve on one side of the plane along which it is to be severed which has a recess at the projecting end, and a piercing member externally engaging the sleeve on the same side of the severance plane as the internal support mandrel and overlying the recess so that the piercing member pierces the sleeve at the severance plane as the mandrel and piercing member are forced toward each other. The mandrel and piercing member may be mounted in plier-type carriers to pivot the mandrel and piercing member with respect to each other. A holding tool may be provided to support the sleeve along the severance plane.

9 Claims, 44 Drawing Figures

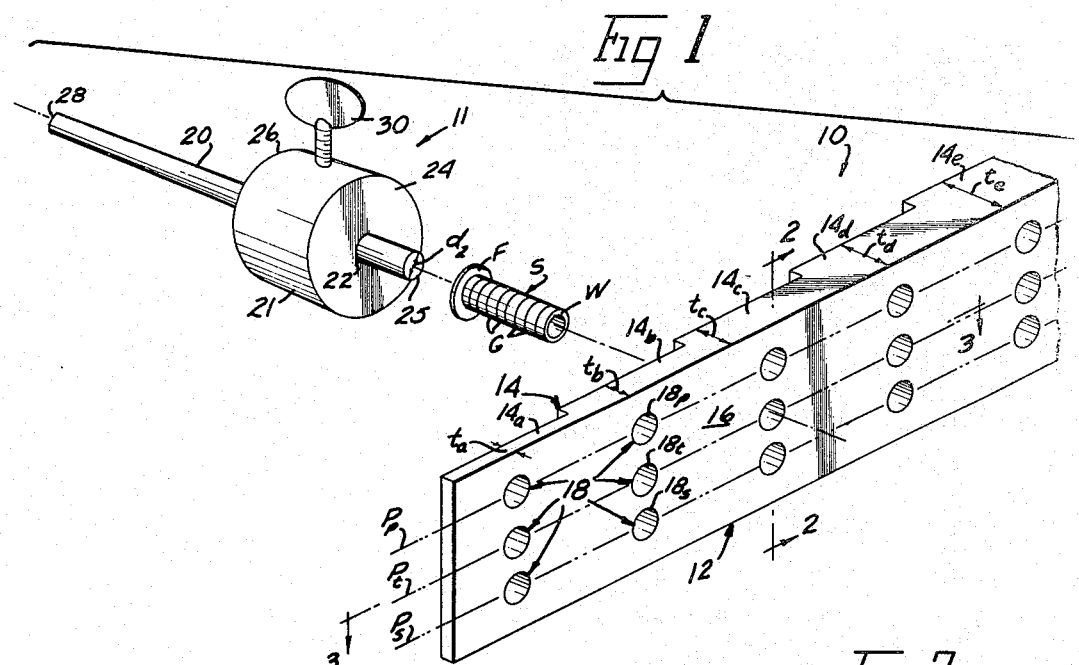
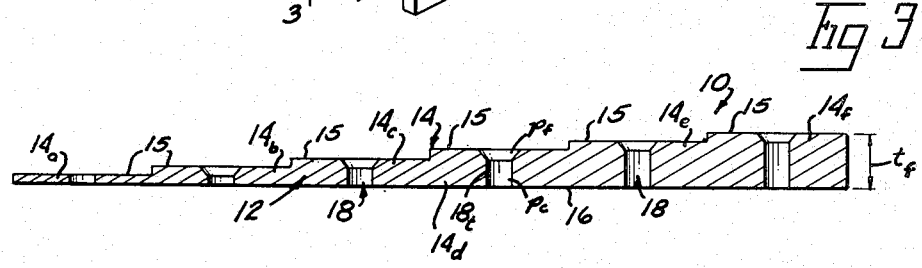
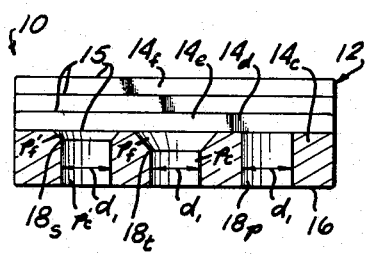
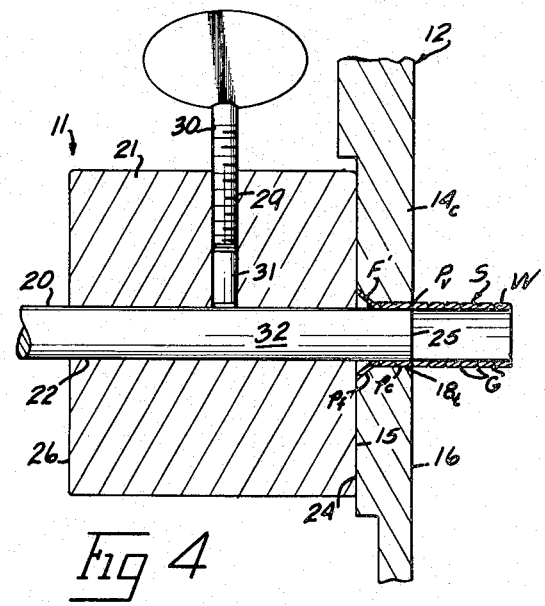

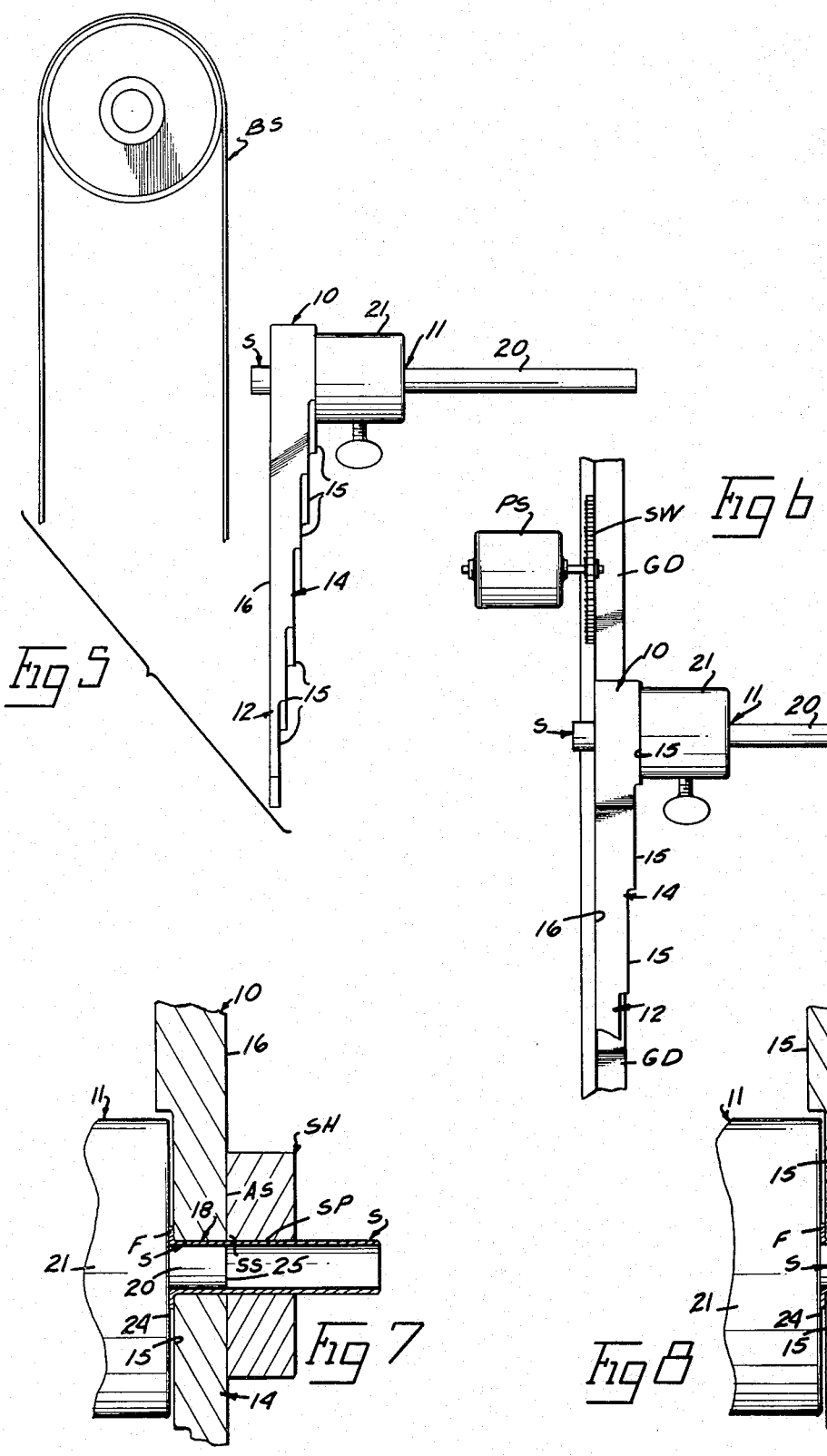

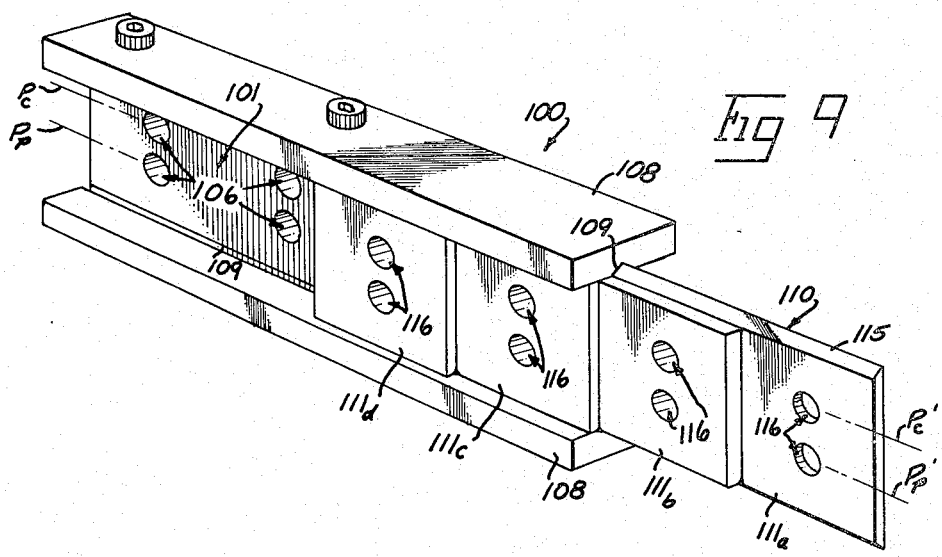
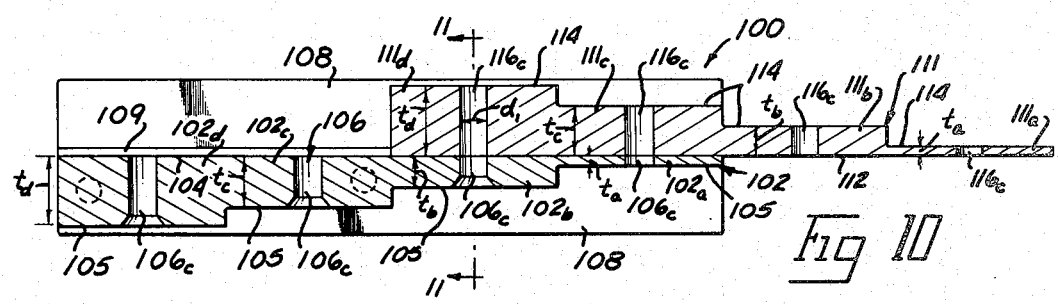
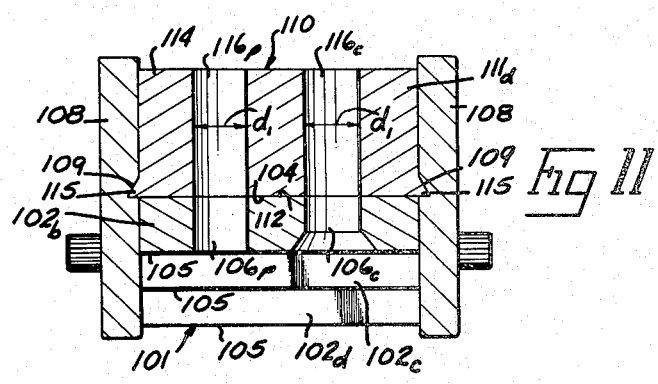

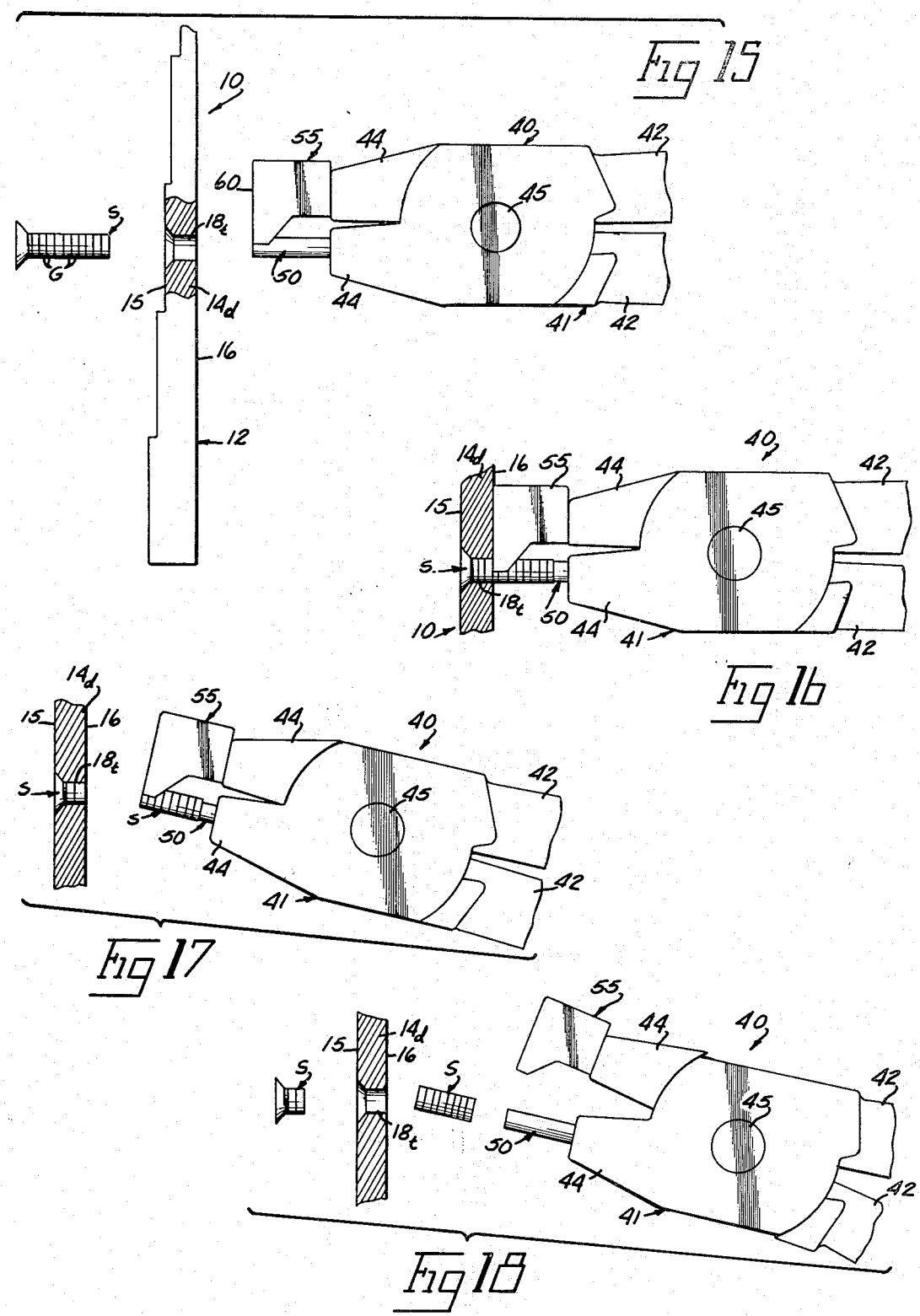

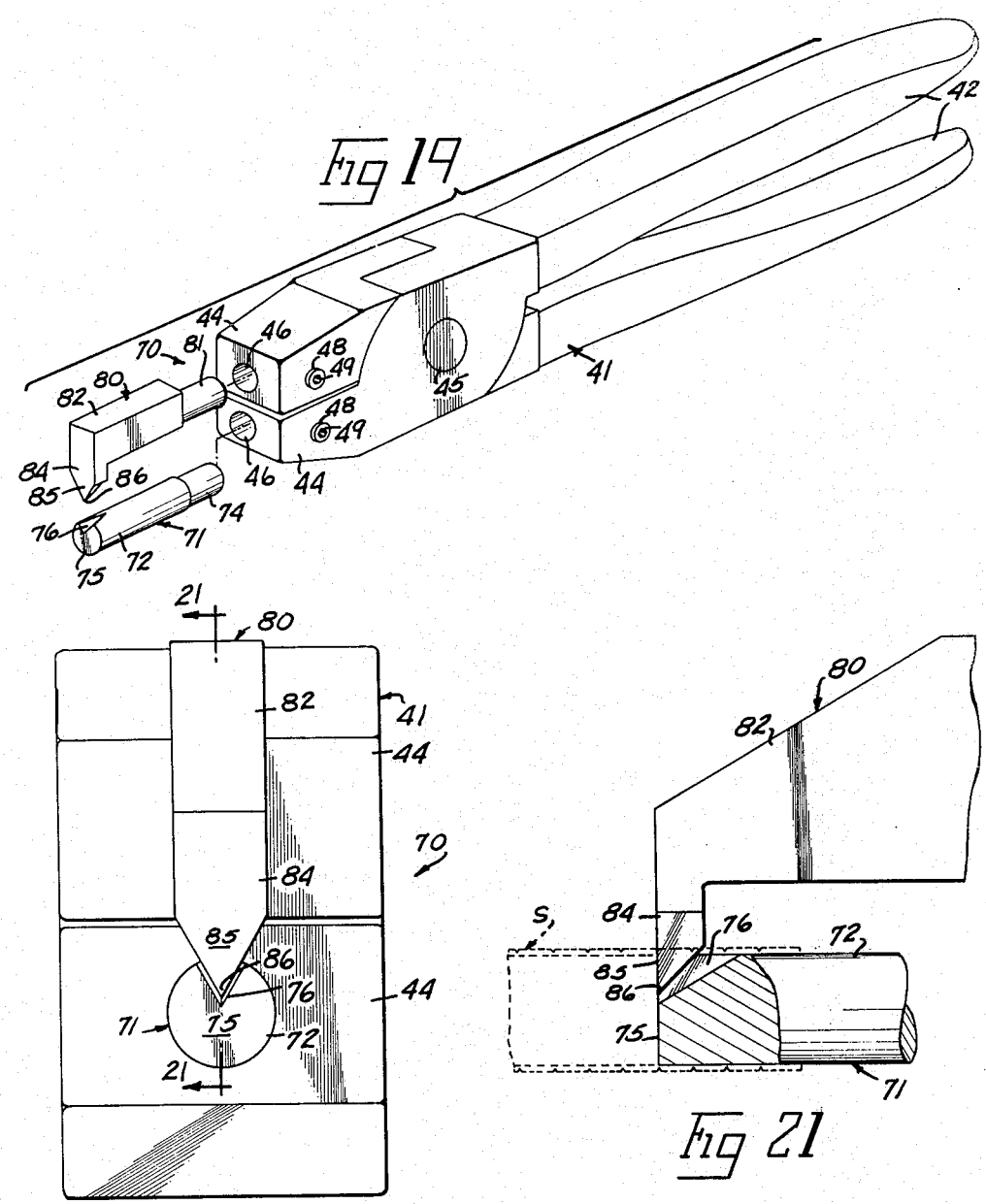

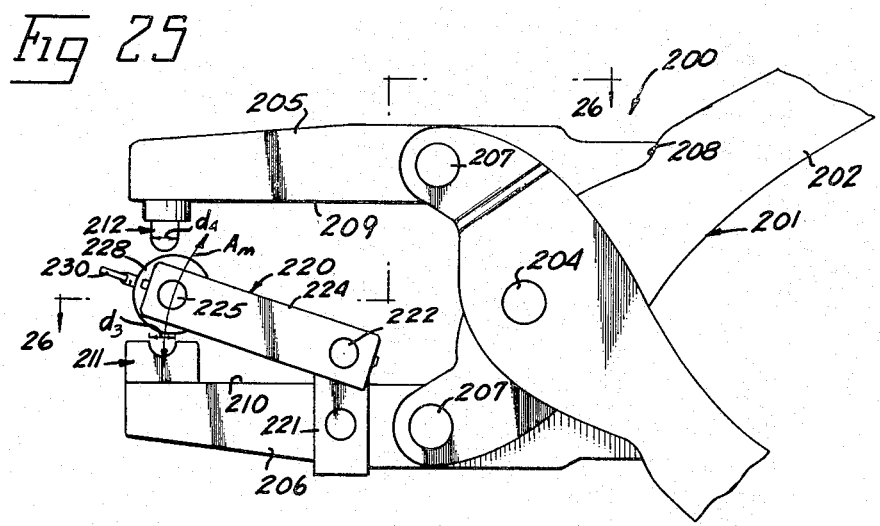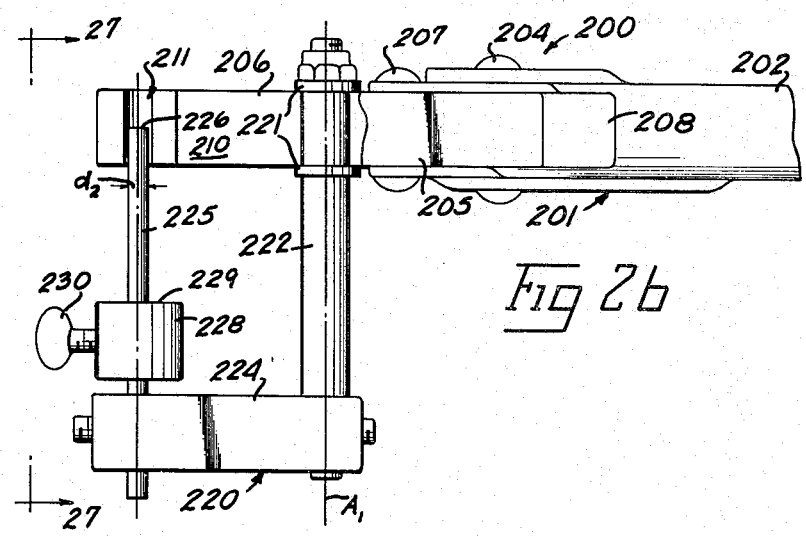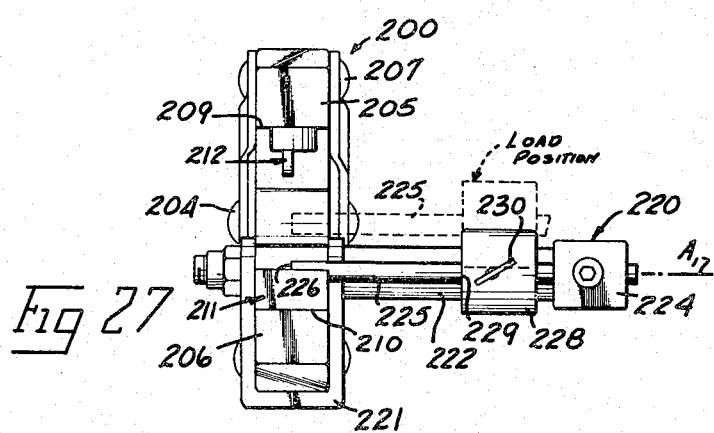

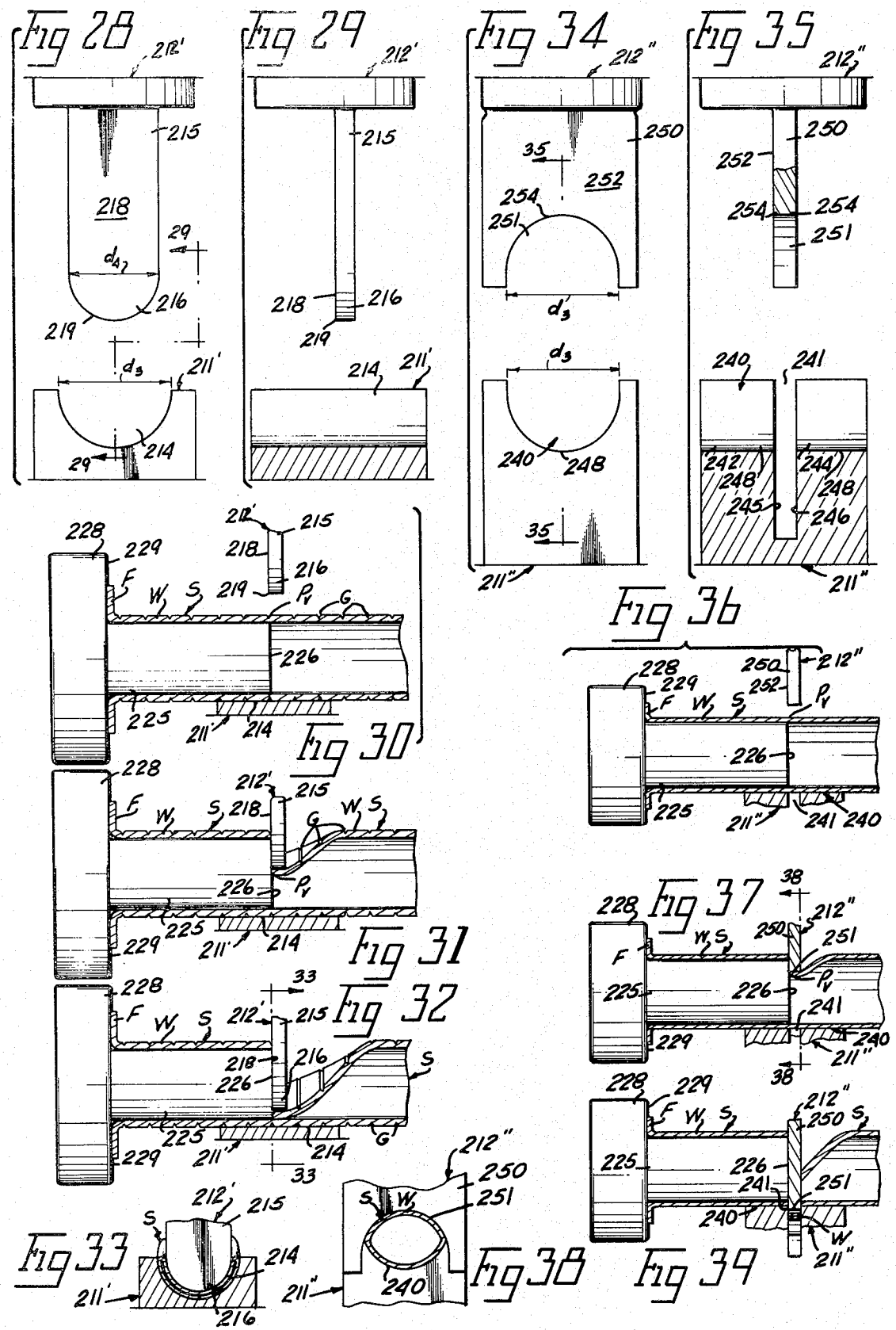

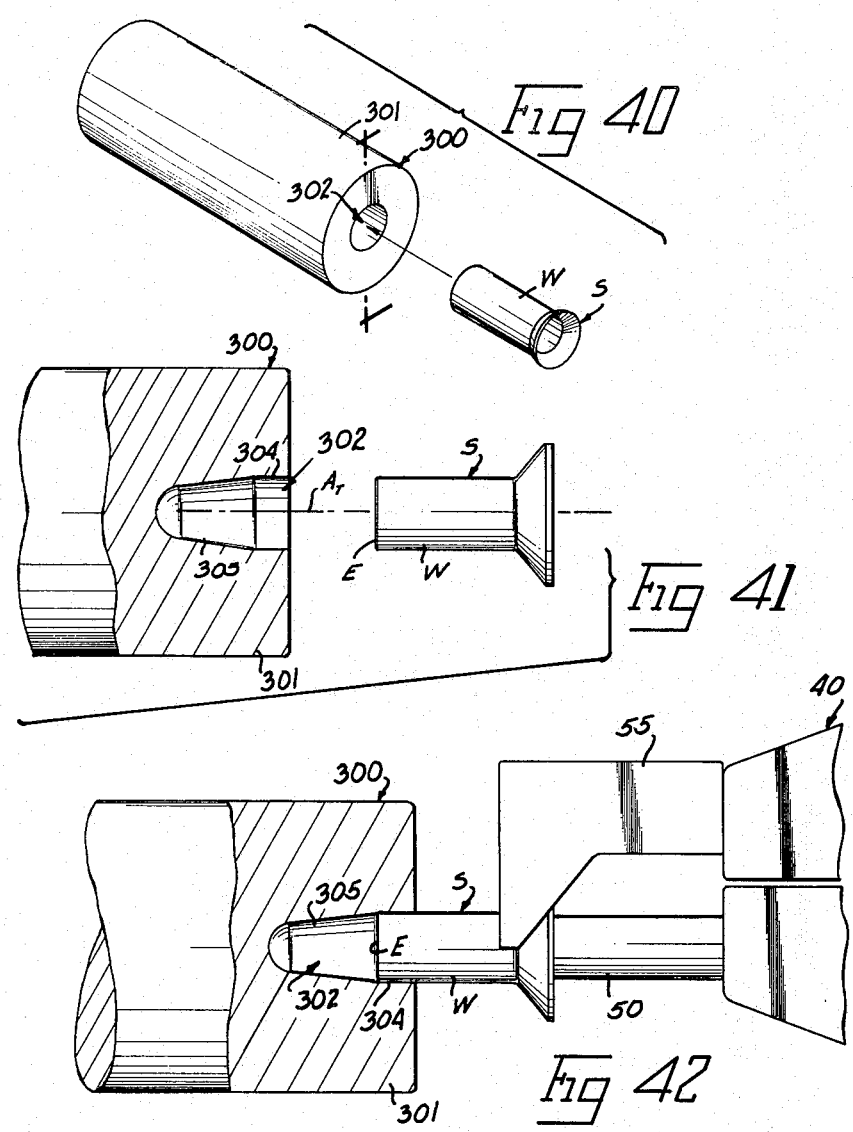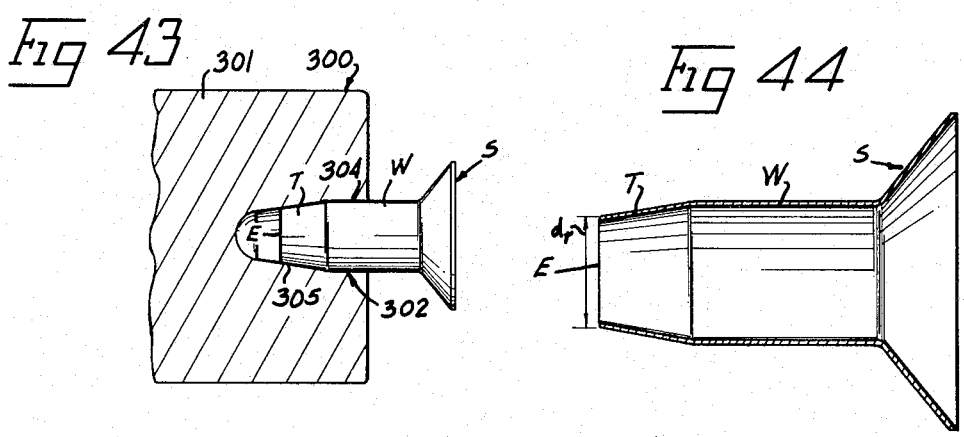

TUBING SEVERING TOOL

This application is a division of my co-pending application Ser. No. 274,613, filed July 24, 1972 for "Tubing Break-Off and Finishing Tool", now U.S. Pat. No. 3,803,895, issued Apr. 16, 1974, which is a continuation-in-part of my co-pending application Ser. No. 882,126, filed Dec. 4, 1969, for "Method and Apparatus for Severing Tubing", now U.S. Pat. No. 3,679,109, issued July 25, 1972, which is in turn a continuation-in-part of my application Ser. No. 711,368, filed Mar. 7, 1968 for "Fastener Adapter and Method", now abandoned.

BACKGROUND OF THE INVENTION

1. Field of the Invention

This invention relates generally to the severing of thin walled tubing and more particularly to the severing of thin walled tubular sleeves.

2. Discussion of the Prior Art

Tubing has frequently been cut to length by circumferentially scribing the outside thereof until the tubing was severed. With very thin walled tubing or tubular sleeves, however, this technique was inadequate since the tubing collapsed or otherwise distorted under the force of the cutting tool. At first sight, it would appear that the cutting to length of ungrooved thin walled tubing or the break-off to length of thin walled tubing having circumferential grooves therearound would be a simple matter. Many trials and the use of many tool designs have proved this assumption erroneous because most break-off techniques deform and/or leave burrs on the end of the tubing.

SUMMARY OF THE INVENTION

These and other problems and disadvantages associated with the prior art are overcome by the invention discribed herein in that very thin walled tubing or tubular sleeves can be severed without detrimentally distorting the tubing. The technique employed by the invention includes externally and internally supporting the tubular sleeve on one side of and closely adjacent the path along which the sleeve is to be severed and subsequently severing the sleeve by shearing, grinding, cutting or breaking When it is desirable to retain the excess portion of the sleeve for use later, the sleeve has the circumferential weakened portion along the path at which the sleeve is to be severed and is at least externally supported about the circumference on one side of and adjacent the weakened portion. The sleeve is supported internally and externally for at least a portion of its periphery on the opposite side of and adjacent the weakened portion. The support on one side of the weakened portion is pivoted with respect to the supports on the opposite side to break the sleeve along the weakened portion.

When the excess portion of the sleeve is not to be retained, the sleeve is internally supported on one side of the path along which the sleeve is to be severed. A piercing member is used to pierce the sleeve along the severance path while the sleeve is supported in opposition to the piercing member to sever same.

These and other features and advantages of the invention disclosed herein will become more clearly understood upon consideration of the following detailed description and accompanying drawings wherein like characters of reference designate corresponding parts throughout the several views and in which:

BRIEF DESCRIPTION OF THE DRAWINGS

FIG. 1 is an exploded perspective view of one embodiment of the invention;

FIG. 2 is a cross-sectional view taken along line 2—2 in FIG.1;

FIG. 3 is a cross-sectional view taken along line 3—3 in FIG. 1;

FIG. 4 is an enlarged partial cross-sectional view showing the invention of FIG. 1 in use;

FIG. 5 illustrates the invention of FIGS. 1 and 4 in use with a grinding machine;

FIG. 6 illustrates the invention of FIGS. 1 and 4 in use with a saw or skiving wheel;

FIGS. 7 and 8 illustrate the invention in use in a shearing mechanism;

FIGS. 9–11 illustrate an alternative embodiment of the step plate of FIGS. 1 and 4;

FIGS. 15–18 illustrate the tool of FIGS. 12-14 in use with the step plate of FIGS. 1 and 4 of the invention;

FIG. 19 is a perspective view of one embodiment of the piercing tool of the invention;

FIG. 20 is an enlarged front end view of the tool of FIG. 19.

FIG. 21 is an enlarged partial cross-sectional view taken along lines 21—21 in FIG. 20;

FIG. 25 is a partial side elevational view of an alternate embodiment of the break-off tool;

FIG. 26 is a cross-sectional view taken along line 26—26 in FIG. 25;

FIG. 27 is a front end view of the tool of FIG. 25;

FIG. 28 is an enlarged partial side view of a set of operating members for the tool of FIGS. 25-27;

FIG. 29 is a cross-sectional view taken along line 29—29 in FIG. 28;

FIGS. 30–33 illustrate the tool of FIGS. 25-27 with the operating members of FIGS. 28 and 29 in use.

FIG. 34 is an enlarged partial side view of an alternate set of operating members for the tool of FIGS. 25-27;

FIG. 35 is a cross-sectional view taken along line 35—35 in FIG. 34.

FIGS. 36–39 illustrate the tool of FIGS. 25-27 with the operating members of FIGS. 34 and 25 in use;

FIG. 40 is a perspective view of a tool for tapering the severed end of a tubular sleeve;

FIG. 41 is a cross-sectional view taken along line 41—41 in FIG. 40;

FIGS. 42 and 43 illustrate the tool of FIGS. 40 and 41 in use; and,

FIG. 44 illustrates a tubular sleeve member which has been tapered with the tool of FIGS. 40 and 41.

Figure 12:
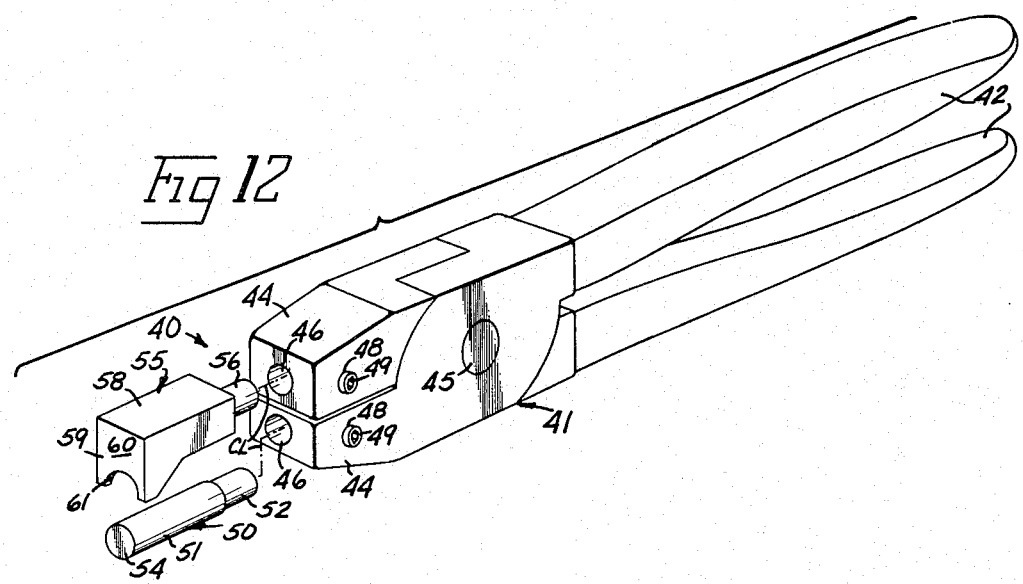
FIG. 12 is a perspective view of a holding tool of the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the drawings, it will be seen that the invention disclosed herein can be used to adjust any thin walled tubing to length. The invention is specifically designed for use in adjusting thin walled tubular sleeves such as those disclosed in applicant's earlier application Ser. No. 711,368 to length. Such sleeves are designated S in FIGS. 1, 4, 6, 7, 14–17, 22, 23, and 26–28 of the drawings. The sleeves S all have a tubular side wall W of a prescribed thickness usually in the order of 0.006 to 0.016 inch. The sleeves S may have a head flange F for protruding head fasteners as seen in FIG. 1 or a head flange F' for countersunk head fasteners as seen in FIG. 4. Also, the side wall W may have circumferential grooves G around the outside thereof as seen in FIG. 1 to facilitate the adjustment of the sleeves S to the grip length of a fastener (not shown). These grooves extend partly through the side wall W and may be spaced along the length of the side wall at predetermined intervals. The grooves G also lie in a plane substantially perpendicular to the axis of the sleeve. Of course, the inside diameter of side wall W is such that the bearing area of a fastener (not shown) would be snugly received therein.

Referring now to FIGS. 1–4, the first embodiment of the invention includes an external support tool 10 and an internal support tool 11. The external support tool 10 includes an elongate stepped plate member 12 comprising a series of step portions 14 integral with each other in an end-to-end relationship. The step portions 14 increase in thickness from one end of member 12 to the other with each step portion having a prescribed thickness along its length. While any number of step portions 14 may be provided, six such portions are illustrated and designated $14_a$–$14_f$. The thickness of each step portion $14_a$–$14_f$ is respectively designated $t_a$–$t_f$. While the change in thickness between each step portion may vary, usually the increase in thickness is one-sixteenth inch with thickness $t_a$ being one-sixteenth inch. This corresponds to the minimum incremental change in grip length of standard fasteners, especially those used in the aerospace industry. Each step portion 14 has straight, opposed parallel bearing surfaces 15 and 16 to define opposed bearing areas with surface 16 being common to all portions 14.

Each step portion $14_a$–$14_f$ defines cylindrical passages 18 therethrough which are normal to the opposed bearing surfaces 15 and 16 and extend therebetween. Three different passages $18_p$, $18_t$ and $18_s$ are illustrated in each portion 14, however, it will be understood that different types of passages 18 may be provided as will become more apparent. The passages $18_p$ in step portions $14_a$–$14_f$ are designed for use with sleeves S adapted for use with protruding head type fasteners (not shown) and are arranged along a common path $P_p$ along the length of plate member 12. The passages $18_p$ are cylindrical along their entire length, all have the same diameter $d_1$, and open onto surface 15 and surface 16. The passages $18_t$ are designed for use with countersunk head fasteners (not shown) for use in tension applications and, in the aerospace industry, are generally designated as the 509 type head fasteners. These passages are arranged along a common path $P_t$. The passages $18_t$ have a cylindrical portion $P_c$ with diameter $d_1$ which opens onto surface 16 at one of its ends, and an outwardly flaring portion $p_f$ at its other end which opens onto the surface 15. The portion $p_f$ conforms to the outside configuration of head flange F' for use with the above specified fasteners so that when the sleeve S is inserted through passage $18_t$ as seen in FIG. 4, the outermost edge of the flange F' is flush with surface 15. The passages $18_s$ are designed for use with countersunk head fasteners (not shown) for use in shear applications and, in the aerospace industry, are generally designated as the low profile type head fasteners. The passages are arranged along a common path $P_s$. The passages $18_s$ are similar to passages $18_t$ with a cylindrical portion $p_c'$ of diameter $d_1$ which opens onto surface 16 at one of its ends, and an outwardly flaring portion $p_f'$ at its other end which opens onto surface 15. The portion $p_f'$ is shallower than portion $p_f$ and conforms to the outside configuration of head flange F' for use with the above specified low profile fasteners so that the flange F' will be flush with surface 15 similarly to that shown in FIG. 4. It will be understood that the passages 18 shown are for purposes of illustration and that other configurations for different fasteners head styles may be used.

The internal support tool 11 includes an elongate cylindrical support member 20 having an external configuration corresponding to the internal configuration of the side wall W of sleeve S to be received in one of the passages 18 and a diameter $d_2$ a prescribed amount less than diameter $d_1$ of passages 18 substantially equal to twice the wall thickness of side wall W of sleeve S. The support member 20 is longer than the maximum length to which the sleeve S is to be adjusted as will become apparent. A stop member 21 is slidably positioned on support member 20 via a centrally located passage 22 defined through stop member 21. Stop member 21 defines an abutting surface 24 one end thereof substantially perpendicular to the axis of passage 22 and support member 20. The passage 22 opens onto surface 24 and the operating end 25 of member 20 projects outwardly therefrom. The operating end 25 of member 20 is cut square as will become apparent. It will also be noted that surface 26 on the opposite end of stop member 21 may be made an abutting surface similar to surface 24 and that the opposite end 28 of support member 20 may be used. A threaded aperture 29 in stop member 21 connects with passage 22 and threadedly receives a locking screw 30 therein. A plastic followeer 31 is placed in aperture 29 between the inner end of screw 30 and support member 20 so that when the screw 30 is tightened, the support member 20 will be locked in position within stop member 21. The follower 31 prevents damage to the outer support surface 32 of support member 20 when screw 30 is tightened.

To use the tools 10 and 11, the appropriate passage 18 in stepped plate member is selected which corresponds to the head flange to the sleeve and head style of the fastener to be used as well as the particular combined material thickness of the work pieces of the joint to be formed and the grip length of the fastener to be used. The operating end 25 of support member 20 is adjusted with respect to the abutting surface 24 so that the end 25 will be flush with surface 16 on the step portion 14 when the sleeve S is inserted through the selected passage 18 from the side on which the surface 15 is located, and when the support member 20 is inserted through sleeve S from that end at surface 15 until the end of sleeve S is seated against the abutting surface of stop member 21. This is illustrated in FIG. 4 which illustrates a sleeve S in a passage $18_t$ of step portion $14_c$. The plane $P_r$ along which the sleeve S is to be severed lies substantially in the plane of surface 16. The sleeve S illustrated has grooves G therearound so that the plane $P_r$ lies within that groove G in alignment with surface 16. This, it will be seen, supports the sleeve S both internally and externally along the length of that portion of sleeve S which is to be used around a fastener.

Because the sleeve S is both internally and externally supported, the sleeve may be cut to length using several different methods such as grinding, shearing or sawing. For example, FIG. 5 illustrates the tools 10 and 11 in use with a grinding machine, here shown as a belt sander BS, to adjust the sleeve S to length. This method can be used with both grooved and ungrooved sleeves S. The operator holds the tools 10 and 11 with the sleeve S protruding from surface 16 and manually forces the protruding end of sleeve S against the grinding member until the grinding member is engaged by surface 16. To prevent significant damage to the step plate member 12, it is made out of a hardened tool steel alloy. The cut end of the sleeve S is now finished with no significant deformation of its cylindrical shape so that it can be removed from tools 10 and 11 and then used in the fastener joint.

Another example of the use of tools 10 and 11 is seen in FIG. 6 with a saw or skiving wheel SW. The saw SW passes along surface 16 of plate member 12 and cuts the sleeve S along plane $P_r$. While saw SW is illustrated as a circular saw, it is to be understood that other types of saws or a skiving wheel may be used. Saw SW is driven by a conventional power source PS and appropriate guide means GD is provided to control the movement of tools 10 and 11 along with sleeve S therein past saw SW to sever sleeve S along plane $P_r$. It should be noted that the sleeve S must be cut or broken along plane $P_r$ without any substantial deformation since such deformation renders the adjusted sleeve unusable.

Another example of the use of tools 10 and 11 is seen in FIGS. 7 and 8. A shear member SH is positioned against the surface 16 of step plate member 12 and defines a shear passage SP therethrough with a shearing shoulder SS adjacent surface 16 about passage SP. The passage SP is just sufficient in diameter to receive that end of sleeve S projecting from surface 16 therethrough as seen in FIG. 7. The shear member SH also defines an abutting surface AS which is normal to passage SP and which is placed in juxtaposition with surface 16 so that when the shear member SH is moved with respect to step plate member 12, while the surface AS is maintained in juxtaposition with surface 16, the shoulder SS will shear the sleeve S along plane $P_r$ as seen in FIG. 8.

It will be noted that there will normally be a separate step plate member 12 for each particular diameter of sleeve S to be severed, however, it is to be understood that different diameters may be provided in a particular step plate member. It will also be noted that a different diameter support member 20 of tool 11 would be provided for each diameter sleeve.

ALTERNATE EMBODIMENT OF STEP PLATE TOOL

Referring more specifically to FIGS. 9–11, an alternate embodiment of tool 10 is illustrated and designated 100. Tool 100 includes a step plate base 101 similar to member 12 of tool 10. The base 101 comprises a series of step portions 102 integral with each other in an end-to-end relationship with the portions 102 increasing in thickness from one end of base 101 to the other similar to portions 14 of tool 10. While four step portions $102_a$–$102_d$ are illustrated, any required number may be provided. Portions $102_a$–$102_d$ have respective thicknesses $t_a$–$t_d$ constant along the length of each.

Each portion has a common flat bearing surface 104 on one side thereof and a separate flat surface 105 opposite surface 104 and parallel thereto.

Cylindrical passages 106 are defined through each step portion, here shown as passages $106_p$ and $106_c$ with the same diameter $d_1$. The passages $106_p$ are arranged along commpn path $P_p$ while passages $106_c$ are arranged along common path $P_c$.

A pair of elongate guides 108 are attached to opposite sides of step plate base 101 and extends along the length thereof parallel to each other so that the common bearing surface 104 lies between guides 108. An inwardly opening guide recess 109 is provided along the inside edge of each guide 108. The recesses 109 are parallel to each other and to the common bearing surface 104 of member 101.

A step plate slide 110 is provided which is slidably receivable between guides 108. Slide 110 is similar in construction to the base 101 with step portions 111, here shown as four step portions $111_a$–$111_d$ with respective thicknesses $t_a$–$t_d$. Each step portion has a common flat bearing surface 112 on one side and a separate flat surface 114 on the opposite side parallel to surface 111. The common surface 112 is placed in juxtaposition with common surface 104 of base 101. Projections 115 are provided on opposite sides slide 110 which are slidably received in recesses 109 when surfaces 104 and 112 are in juxtaposition and maintains them in juxtaposition as slide 110 is moved longitudinally of itself along the base 101.

Passages 116 having diameters $d_1$ are provided through each step portion 111, here shown as two passages $116_p$ and $116_c$. The passages $116_p$ are arranged along a common path $P_p'$ and passages $116_c$ are arranged along a common path $P_c'$. The path $P_p'$ is aligned with path $P_p$ so that any one of passages $116_p$ in slide 110 may be placed in registration with any one of passages $106_p$ in base 101. Likewise, path $P_c'$ is aligned with path $P_c$ so that any one of passages $116_c$ in slide 110 may be placed in registration with any one of passages $106_c$ in base 101. The passages $106_p$ and $116_p$ are for protruding head type fasteners so that both passages $106_p$ and $116_p$ have a constant diameter circular cross-section along their length while passages $106_c$ and $116_c$ are for countersunk head type fasteners so that passages $116_c$ have a constant diameter while passages $106_c$ have a cylindrical portion and a countersunk portion which opens onto surface 105 to accommodate the sleeves S for countersunk head fasteners as set forth above.

The tool 100 is used similarly to tool 10 except that the slide 110 may be positioned so that the proper passage 106 is in registration with the proper passage 116 to obtain the proper sleeve length. While various dimensions may be used for thicknesses $t_a$–$t_d$ for base 101 and slide 110, one suggested arrangement is one-sixteenth inch for thicknesses $t_a$ and increases of one-eighth inch between step portions 102 of base 10 and step portions 111 of slide 110. It is to be further understood that the tool 11 may be used in conjunction with tool 100 in a manner similar to use with tool 10 except that the support member would extend completely through the passages 106 and 108 in registration and the operating end 25 thereof would be flush with surface 114 if both base 101 and slide 110 are used or surface 104 if only base 101 is used.

GRIPPING TOOL

Figure 13:
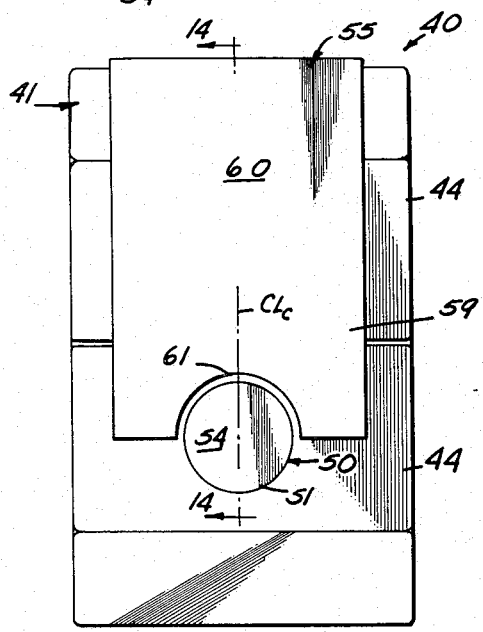
FIG. 13 is an enlarged front end view of the operating end of the tool of FIG. 12.
Figure 14:
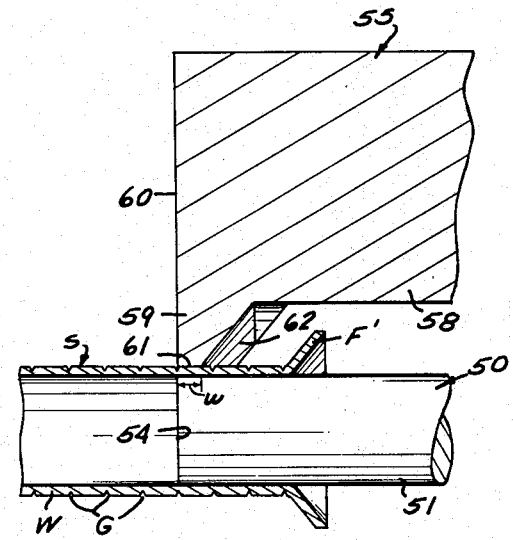
FIG. 14 is an enlarged cross-sectional view taken along line 14—14 in FIG. 13.

Referring now to FIGS. 12–14 a gripping tool 40 of the invention is illustrated. The gripping tool 40 includes a carrier 41 made from a modified pair of pliers with handles 42 and jaws 44 pivoted together in conventional manner at 45 so that as the handles 42 are pivoted toward each other, the jaws 44 will also be pivoted toward each other. The forward ends of jaws 44 each defines a forwardly facing bore 46 therein. The bores 46 are arranged so that the centerlines CL thereof move in a common plane and so that the centerlines CL are substantially parallel when the handles 42 are fully closed as will become apparent. Threaded aperture 48 is provided in each jaw 44 which communicates with each bore 46 and threadedly receives a set screw 49 therein as will become more apparent.

A mandrel 50 is provided which is placed in one of the bores 46. Mandrel 50 includes a support section 51 and a base section 52. The base section 52 is slidably received in bore 46 and locked therein by set screw 49 so that support section 51 extends forwardly of jaw 44. Support section 51 has a constant diameter corresponding to the inside diameter of sleeve s, so that it will be snugly received in sleeve S similar to support member 20. The forwardly projecting end 54 of support section 51 is cut square similar to the operating end 25 of support member 20.

A clamp 55 is provided which is placed in the bore 46 in the opposite jaw 44. Clamp 55 includes a base section 56 similar to section 52 of mandrel 50 which is slidably received in the bore 46 and locked therein by set screw 49. The clamp 55 includes a body 58 projecting forwardly of section 56 with a clamping flange 59 on the forwardmost projecting end thereof. The clamp 55 is oriented so that flange 59 faces the support section 51 of mandrel 50. The forwardly facing end 60 of flange 59 is in alignment with the end 54 of mandrel 50 when the carrier 40 is closed on a sleeve S as seen in FIG. 14. The outermost edge of flange 59 facing mandrel 50 defines a semi-circular concave gripping surface 61 with a diameter substantially equal to the outside diameter of sleeve S with the centerline $CL_c$ thereof passing through the centerline of mandrel 50 and perpendicular to same when the handles 42 are closed as seen in FIGS. 13 and 14. The back side of flange 59 is undercut at 62 to conform to the external shape of a head flange F' for a countersunk head sleeve S as best seen in FIG. 14. The surface 61 has a width w substantially equal to the spacing between the grooves G on sleeve S.

FIGS. 15–18 illustrate the use of gripping tool 40 in combination with an external support tool 10 to adjust grooved sleeves S to length. It will be noted that the use of tool 11 may be eliminated as seen in FIGS. 15–18 when the sleeves S are made of a strong material such as stainless steel. It is to be understood, however, that the tool 11 may be used as shown in FIG. 4.

The sleeve S is inserted through the appropriate passage 18 in plate member 12, here shown as passage $18_t$, until the head flange is fully seated as seen in FIG. 15. Then the mandrel 50 of tool 40 is inserted into the projecting end of sleeve S. The tool 40 is positioned so that when the handles 42 are forced together, the end 60 of clamp 55 abuts surface 16 of plate member 12 and the sleeve S is gripped between mandrel 50 and clamp 55 closely adjacent the severance plane $P_r$ or groove G along which the sleeve S is to be severed as seen in FIG. 16. The tool 40 and tool 10 are then pivoted with respect to each other to cause the sleeve S to break along plane $P_r$ and groove G as seen in FIG. 17. The adjusted portion of sleeve S is then removed from tool 10 and the excess portion removed from tool 40 as seen in FIG. 18. This system is advantageous in that not only is the adjusted portion usable, but also the excess portion.

It will also be noted that the forwardmost end 60 of clamp 55 serves as a locating means for the mandrel 50 since the operating end 54 of the mandrel is always aligned with end 60 against the surface 16 of plate member 12, severing of the sleeve along plane $P_r$ is assured.

PIERCING TOOL

A piercing tool 70 of the invention as best seen in FIGS. 19–21 is provided for breaking grooved sleeves S where it is not desirable that the removed excess portion of the sleeve S be usable. The tool 70 includes the same carrier 41 as illustrated for tool 40 with its handles 42, jaws 44, pivot 45, bores 46 and set screws 49.

A piercing mandrel 71 is provided which is similar to mandrel 50 with a support section 72 and base section 74. The outboard end 75 of section 71 defines an outwardly opening V-shaped recess 76 therein having a maximum depth at its outer end 75 and decreasing in depth along section 72 toward section 74. The mandrel 71 is positioned in one bore 46 and locked in place via set screw 49 so that the recess 76 faces the opposite jaw 44 as will become apparent.

A piercing unit 80 is also provided with a base section 81 received in the opposite bore 46 and locked in place by set screw 49. The unit 80 includes a main body 82 with a piercing point 84 at the outboard end thereof which faces mandrel 71. The point 84 has a forwardly facing surface 85 which is aligned with the end 75 of mandrel 71 when the handles 42 are substantially closed. The tip 86 of point 84 is also aligned with the end 75 as well as recess 76 so that the tip 86 moves into recess 76 when the handles 42 are fully closed as will become more apparent.

Figure 22:
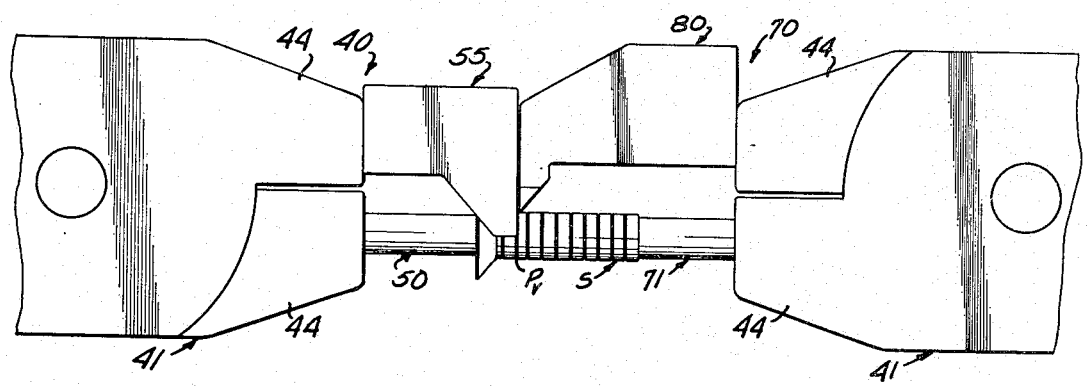
FIGS. 22–24 illustrate the tools of FIGS. 12 and 19 in use.
Figure 23:
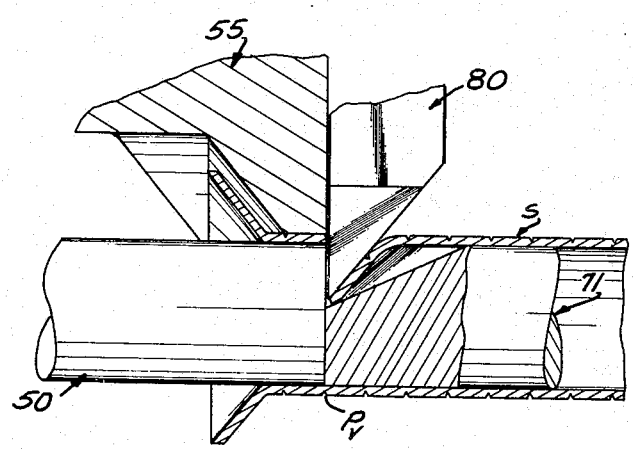
Figure 24:
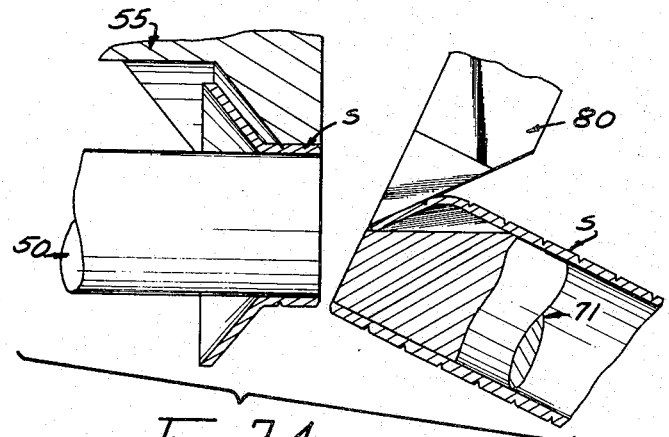

The piercing tool 70 is shown in use with the gripping tool 40 in FIGS. 22–24 to adjust sleeves S to length. The sleeve S, which has grooves G therein, is inserted over the mandrel 50 and the clamp 55 closed onto the sleeve S to grip same so that the end 54 of mandrel 50 and end 60 of clamp 55 are aligned with the plane $P_r$ and groove G along which sleeve S is to be severed. The piercing mandrel 71 of tool 70 is then inserted into the other end of sleeve S until the end 75 of mandrel 71 abuts the end 54 of mandrel 50. The tools 40 and 70 are oriented so that the clamp 55 and piercing unit 80 are aligned as best seen in FIG. 22. The handles 42 of tool 70 are then forced together to the position shown in FIG. 23. This causes the excess portion of the sleeve S adjacent groove G in plane $P_r$ to rupture inwardly and start the fracture of sleeve S along groove G. The useful part of sleeve S is not deformed because the clamp 55 and mandrel 50 confines the side wall W of sleeve S adjacent the rupture. The severing operation can be completed by pivoting the tools 40 and 70 about the abutting ends 54 and 75 of mandrels 50 and 71 as seen in FIG. 24. The partial rupturing of the sleeve S along groove G serves to start the fracture of the sleeve thus requiring less force to finish the breaking of the sleeve, especially when the sleeve is made out of a strong material such as stainless steel.

COMBINATION GRIPPING AND CUT-OFF TOOL

Referring now specifically to FIGS. 25-27, a cut-off tool 200 is shown. The tool 200 includes a carrier 201 made from a pair of commercially available pliers with a pair of handles 202 pivotally pinned together at 204 and spring urged apart. A pair of opposed jaws 205 and 206 are pinned to the forwardmost ends of handles 202 at 207 and are engaged at their rear end by the opposite handle 202 in an appropriately designed pocket 208 which causes the opposed working surfaces 209 and 210 of jaws 205 and 206 respectively to be maintained parallel as the jaws are opened and closed. An anvil 211 is mounted on the extending end of jaw 206 on the surface 210 and a severing member 212 is mounted on the extending end of jaw 205 on working surface 209 and in alignment with anvil 211 so that the two mesh when jaws 205 and 206 close.

A positioning assembly 220 is mounted on jaw 206 and movable therewith to selectively position a sleeve S with respect to anvil 211 and member 212. The assembly 220 is generally U-shaped and is pivotally mounted on jaw 206 through bracket 221. Assembly 220 includes a pivot shaft 222 journalled in bracket 221 and pivotal about an axis $A_1$ to position the sleeve S with respect to anvil 211 and severing member 212. The shaft 222 extends laterally outward from one side of jaw 206 and mounts on its extending end a swing arm 224 which projects generally forward of shaft 222, spaced outwardly from and generally parallel to jaw 206. The arm 224 pivots with shaft 222 and mounts at its forward end thereof an inwardly extending support mandrel 225 whose axis is parallel to the axis of shaft 222. The arm 224 is arranged so that when mandrel 225 moves along an arc $A_m$, the arc intersects the supporting surface an anvil 211 as will become more apparent. The mandrel 225 corresponds generally to the support member 20 of tool 11 with a circular cross-section of constant diameter $d_2$ corresponding to the inside diameter of sleeve S so that the sleeve S can be placed thereover and supported thereby. The inwardly projecting end 226 of mandrel 225 is cut square and the sleeve S is positioned so that the end 226 is always aligned with the cutting plane of the member 212 in conjunction with anvil 211 as will become more apparent.

A stop member 228 is slidably mounted on mandrel 225 and is constructed similar to member 21 of tool 11. It also serves a similar function and has an abutting surface 229 perpendicular to the axis of mandrel 225 facing the severing member 212. A lock screw 230 is provided for selectively locking the stop member in place on mandrel 225. The stop member 228 is adjustable on mandrel 225 so that it can be positioned to always locate the plane $P_t$ along which the sleeve S is to be severed in alignment with the pro-jecting end 226 of mandrel 225. Thus, since the end 226 of mandrel 225 is always located in alignment with the cutting plane of severing member 212 and anvil 211, the sleeve S can be easily located so that it can be severed along any desired severance plane $P_t$ along its length.

There are two versions of the anvil 211 and severing member 212, the first version being designated 211' and 212' respectively as best seen in FIGS. 28 and 29 for piercing a grooved sleeve S along a groove G which lies in the plane $P_t$ along which the sleeve is to be severed, and the second version being designated 211" and 212" as best seen in FIGS. 34 and 35 for shearing off a sleeve S which is either plain or grooved along the plane $P_t$ along which the sleeve is to be severed. The matched anvil 211' and severing member 212' may be interchanged with the matched anvil 211" in known manner.

The anvil 211' of the piercing embodiment seen in FIGS. 28 and 29 defines a transversly extending, inwardly opening, recess 214 thereacross having a semicircular cross-section of diameter $d_3$ which is substantially equal to the outside diameter of sleeve S to be severed. The severing member 212, as seen in FIGS. 28 and 29 includes an inwardly extending tip 215 with a generally rectangular cross-section and a convex semicircular point 216 of diameter $d_4$. The point 216 is oriented so that its centerline is aligned with and parallel to the centerline of recess 214 and centerlines of both are parallel to axis $A_1$ of shaft 222. The diameter $d_4$ is generally less than diameter $d_3$ by four times the wall thickness of sleeve wall W as will become more apparent. One side 218 of tip 215 is centered with respect to the length of recess 214 and that edge 219 of point 216 is sharpened as best seen in FIG. 29 so that the cutting plane of anvil 211' and severing member 212' lies along side 218 of tip 215 and normal to the centerline of anvil 211' and mandrel 225.

When using the piercing anvil 211' and member 212' the stop member 228 is positioned on mandrel 225 so that the distance between the abutting surface and end 226 of mandrel 225 corresponds to the length of sleeve S and locked into position with screw 230. The assembly 220 is pivoted until support mandrel 225 is located intermediately of the jaws 205 and 206 as shown by dashed lines in FIG. 27. The sleeve S is then inserted over mandrel 225 until the head flange rests against the abutting surface 229 of stop member 228. The assembly 220 is then pivoted until the bottom portion of sleeve S rests on anvil 211' within recess 214. This is best seen in FIG. 30. The handles 202 are then forced together to cause the point 216 to engage the sleeve S at the plane $P_t$ along which it is to be severed with the side 218 thereof passing across the end 226 of mandrel 225. The sharpened edge 219 of point 216 cuts the sleeve S along plane $P_t$ and folds the excess portion of sleeve S inwardly thereby rupturing groove G lying within plane $P_t$ as seen in FIGS. 31-33. When the operation is finished, the excess portion has that section adjacent the plane $P_t$ is folded back on itself as seen in FIGS. 32 and 33. The severing operation is finished by manually exerting a transverse force on the excess portion of the sleeve after the gripping force on the handles 202 has been released.

The anvil 211" of the shear-off embodiment of FIGS. 34 and 35 defines a transversely extending, inwardly opening, U-shaped recess 240 thereacross. An inwardly opening slot 241 is defined through anvil 211" perpendicular to the centerline of anvil 211" and intersects recess 240 to divide the recess 240 into a near portion 242 and a far portion 244. This defines a working surface 245 on anvil 211″ about near portion 242 which is aligned with the cutting plane of anvil 211″ and member 212″ and a working surface 246 on anvil 211″ about far portion 244. The recess 240 defines a semicircular support surface 248 at its closed end corresponding to that of recess 214 of anvil 211′ with the diameter $d_3$.

The severing member 212″ of the shear-off embodiment of FIGS. 34 and 35 includes an inwardly extending blade 250 generally rectangular in cross-section and with a thickness such that it will just be slidably received in the slot 241. An inwardly opening, transversely extending, U-shaped shearing recess 251 is defined through blade 250 to mate with recess 240 of anvil 211″. The centerline of recess 251 is aligned with and parallel to the centerline of recess 240 and the centerlines of both are parallel to axis $A_1$ of shaft 222. The closed end of recess 251 is semi-circular with the same diameter $d_3$ as recess 240 so that the sleeve S will be completely encircled when it is initially engaged by both anvil 211″ and severing member 212″. That side 252 of blade 250 in juxtaposition with working surface 245 of anvil 211″ lies within the cutting plane thereof. The far and near edges 254 of blade 250 along recess 251 are cut square to for cutting edges as seen in FIG. 35.

When using the shear-off anvil 211″ and severing member 212″, the stop member 228 is positioned on mandrel 225 so that the distance between the abutting surface and end 226 of mandrel 225 corresponds to the length of sleeve S and locked into position with screw 230. The assembly 220 is pivoted until support mandrel 225 is located intermediately of the jaws 205 and 206 as shown by dashed lines in FIG. 27. The sleeve S is then inserted over mandrel 225 until the head flange rests against the abutting surface 229 of stop member 228. The assembly 220 is then pivoted until the bottom portion of sleeve S rests on anvil 211″ within recess 240. This is best seen in FIG. 36. The handles 202 are then forced together to cause the blade 250 to engage the sleeve S at the plane along which it is to be severed with the side 252 thereof passing across the end 226 of mandrel 225. The sharpened near edge 254 of blade 250 shears the sleeve S along plane $P_r$ and folds the excess portion of sleeve S inwardly regardless of whether the sleeve S is grooved or not as seen in FIGS. 37 and 38. As the blade 250 continues to move, the closed end of recess 251 passes the closed end of recess 240 to finish the severing operation.

While only one set of anvils 211′ and 211″, severing members 212′ and 212″, mandrel 225, and stop member 228 is illustrated, for a particular diameter sleeve S, it is to be understood that a separate set would be provided for each diameter of sleeve used and that the various size parts may be interchanged in the carrier 201.

TAPERING AND FINISHING TOOL

Because of the projecting severed end of a sleeve S that has been adjusted to length sometimes either damages the holes in a work piece through which the adjusted length sleeve is inserted or hangs on any misaligned work pieces as it is inserted in the holes, it is desirable to taper a prescribed portion T of the side wall W inwardly a prescribed amount as seen in FIG. 44. The tapered portion T irons out any irregularities within the holes and will not hang on irregularities as the sleeve is inserted, especially in interference.

FIGS. 40–43 illustrate a tool 300 which tapers the severed end E of a sleeve S. The tool 300 includes a body 301 defining a bore 302 therein along an axis $A_t$ with a cylindrical portion 304 of constant diameter $d_t$ such that the end E of sleeve S will just be slidably received therein and an inwardly tapering portion 305 joined to the inner end of portion 304.

As the end E of sleeve S is inserted into bore 302 and forced toward the portion 305 while the sleeve S and tool 300 are rotated with respect to each other as illustrated in FIGS. 42 and 43, the portion 305 smooths any irregularities on the end E while at the same time spinning the tapered portion T in side wall W. This may be done by holding the sleeve S with gripping tool 40 as seen in FIG. 42 and rotating tool 300 either manually or otherwise. The end E is reduced to a diameter $d_r$, usually in the order of a few thousandths of an inch. The taper T may also be rolled therein.

While specific embodiments of the invention have been disclosed herein, it is to be understood that full use may be made of modifications, substitutions and equivalents without departing from the scope of the inventive concept.

I claim:

1. Apparatus for adjusting the length of thin walled tubular sleeves including:

an internal support mandrel slidably receivable into the tubular sleeve from one end thereof having an external support surface with a configuration conforming to the internal configuration of the sleeve to internally support the sleeve about the circumference thereof and a projecting end selectively aligned with that plane at which the sleeve is to be severed, said support mandrel defining a piercing recess therein adjacent to and opening onto both said projecting end and said external support surface adjacent said projecting end so that that portion of the sleeve overlying said piercing recess is not internally supported;

a piercing member including a piercing point, said piercing point having a piercing tip thereon constructed and arranged to pierce the sleeve in that plane at which the sleeve is to be severed in alignment with said projecting end of said internal support member and said recess therein; and, carrier means mounting said internal support mandrel and said piercing member so that said piercing tip is in alignment with said projecting end of and said recess in said internal support mandrel when said piercing tip pierces the sleeve for selectively moving said piercing member toward the sleeve to cause said piercing tip to first pierce the sleeve at that plane along which the sleeve is to be severed, and then to force a portion of the sleeve adjacent said plane into said recess on said internal support mandrel.

2. The apparatus of claim 1 further including at least one stepped plate member comprising a series of step portions integral with each other in an end-to-end relationship, said step portions increasing in thickness from one end of said plate member to the other, each of said step portions having a common straight bearing surface and a separate straight bearing surface opposed to said common surface and parallel thereto, each of said step portions defining at least one passage therethrough normal to said surfaces having a diameter just sufficiently large to receive the thin walled tubular sleeve therethrough so that the sleeve is supported externally about the circumference thereof within said stepped plate member.

3. The apparatus of claim 1 further including a pair of stepped plate members, each of said stepped plate members comprising a series of step portions integral with each other in an end-to-end relationship, said step portions of each of said plate members increasing in thickness from one end of said plate member to the other, each of said step portions having a common straight bearing surface and a separate straight bearing surface opposed to said common surface and parallel thereto, each of said step portions of each of said plate members defining at least one passage therethrough having a diameter just sufficiently large to receive the thin walled tubular sleeve therethrough, and further including guide means for maintaining said common bearing surfaces of both of said stepped plate members in juxtaposition with each other and for permitting sliding movement of said plate members relative to each other for any selected one of said passages in one of said stepped plate members to be placed in registration with any selected one of said passages in the other of said stepped plate members for insertion of the sleeve through said passages in registration with each other so that the sleeve is supported externally about the circumference thereof within both of said stepped plate members.

4. The apparatus of claim 1 wherein said carrier means is a plier-type mechanism comprising a pair of handles pivoted together, each of said handles including a jaw member integral therewith, said jaw members arranged in opposition to each other so that said jaw members are moved toward each other as said handles are moved toward each other, each of said jaw members defining a bore therein, said internal support mandrel carried by one of said bores and said piercing member carried by said other of said bores.

5. The apparatus of claim 4 wherein said recess in said support mandrel has a V-shaped cross-section and opens onto said projecting end of said support mandrel.

6. The apparatus of claim 5 wherein said recess has a maximum depth at said projecting end of said mandrel and decreases in depth along the length of said recess.

7. The apparatus of claim 4 wherein said piercing point defines an end surface substantially aligned with that plane along which the sleeve is to be severed when said internal support mandrel and said piercing point are moved toward each other, said tip located at said end surface for piercing the sleeve.

8. The apparatus of claim 1 wherein said recess in said support mandrel has a V-shaped cross-section said recess having a maximum depth at said projecting end of said mandrel and decreasing in depth along the length of said recess, and wherein said piercing point defines an end surface substantially aligned with that plane along which the sleeve is to be severed when said mandrel and said piercing point are moved toward each other said tip located at said end surface for piercing the sleeve.

9. The apparatus of claim 2 wherein said recess in said support mandrel has a V-shaped cross-section said recess having a maximum depth at said projecting end of said mandrel and decreasing in depth along the length of said recess, and wherein said piercing point defines an end surface substantially aligned with that plane along which the sleeve is to be severed when said mandrel and said piercing member are moved toward each other, said end surface abutting said common bearing surface of said stepped plate member to locate said piercing tip at the plane of said common bearing surface of said stepped plate member.

* * * * *